No. 773,956. PATENTED NOV. 1, 1904.
G. MASSINI.
ACETYLENE GAS LAMP.
APPLICATION FILED DEC. 10, 1902.
NO MODEL.
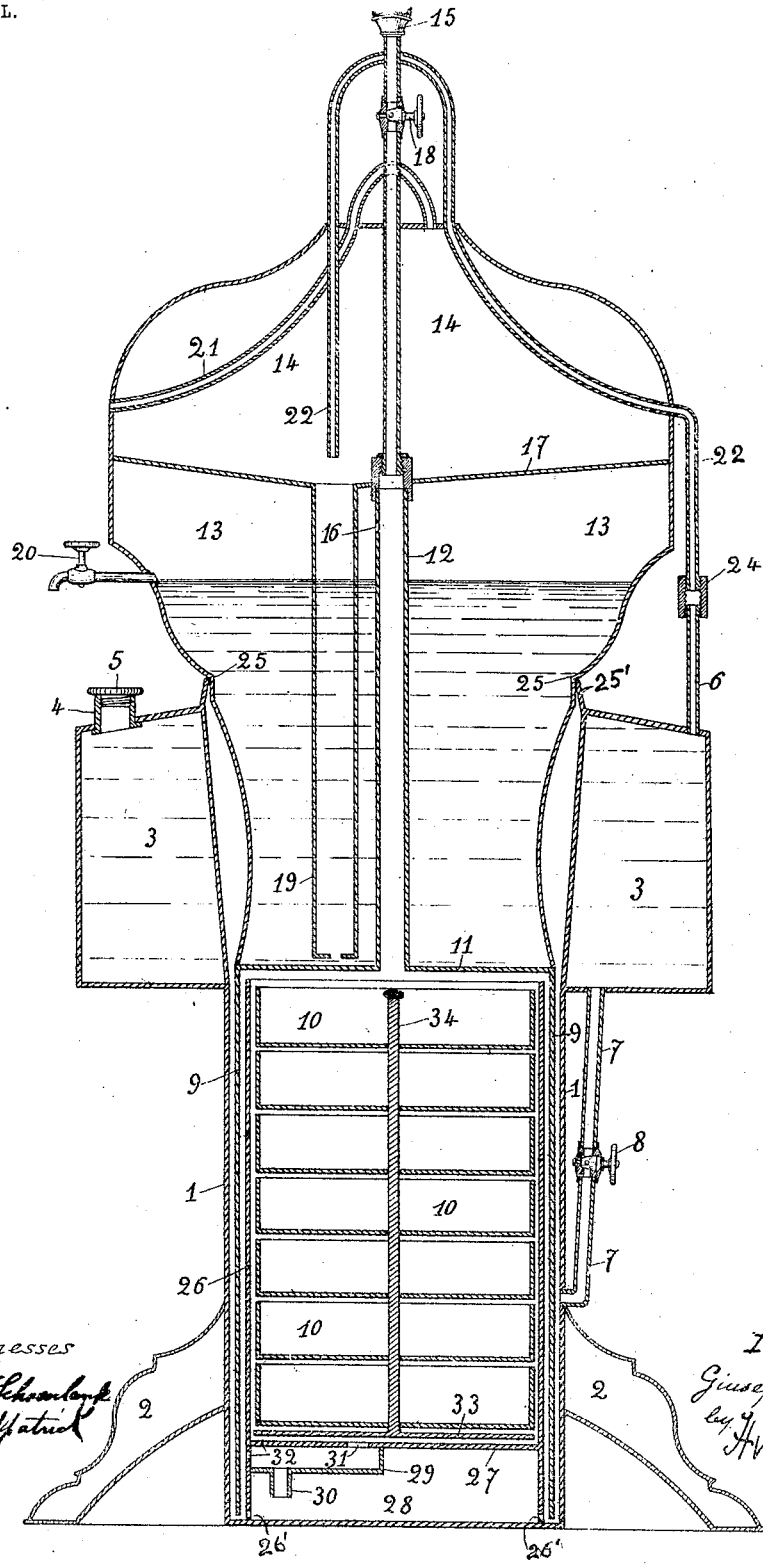
Witnesses
George G. Schoenlank
Thomas Kilpatrick
Inventor
Giuseppe Massini
by H. Van Oldenneel
Attorney No. 773,956.

Patented November 1, 1904.

UNITED STATES PATENT OFFICE.

GIUSEPPE MASSINI, OF ROME, ITALY.

ACETYLENE-GAS LAMP.

SPECIFICATION forming part of Letters Patent No. 773,956, dated November 1, 1904.

Application filed December 10, 1902. Serial No. 134,669. (No model.)

*To all whom it may concern:*

Be it known that I, GIUSEPPE MASSINI, clergyman, a subject of the King of Italy, residing at Rome, Kingdom of Italy, have invented a new and useful Improvement in Acetylene-Gas Lamps; and I do hereby declare the following to be a full, clear, and exact description of the same.

The present invention has for its object an acetylene-gas lamp in connection with a generator wherein the gas production is regulated by means of two superposed chambers, whereof the lower one, partly filled with water, acts as a gas-reservoir, and the other serves for collecting the water from the chamber below. The water rising in the higher chamber shuts the orifice of a tube, which puts in communication the atmosphere with the feedwater reservoir of the carbid-chamber, thus preventing the flowing of the water, and consequently the production of fresh gas, until by reason of the greater gas consumption in consequence of combustion or from other cause the water of the upper chamber goes back into the lower one, whereby the normal operation of the generator and lamp takes place again.

The annexed drawing shows a vertical section of a lamp embodying my invention.

Referring to the drawing in detail, 1 is a cylindrical chamber, closed at the bottom and open at the top, provided with a base 2 and an annular reservoir 3. The reservoir is provided with a filling-opening 4, closed by a plug 5. A tube 6 leads upward from the reservoir for a purpose to be explained, and another tube 7 leads downward from the reservoir, connecting the reservoir with the chamber 1. A cock 8, located on the tube 7, serves to stop or to regulate the flow of the water from the reservoir 3.

Within the chamber 1 is received the lower portion of the lamp-body, the upper portion of the lamp-body extending upward above the chamber 1. The lower portion of the lamp-body consists of a cylinder 9, open at its lower end, adapted to be received within the chamber 1. Within the cylinder 9 is arranged a vessel 26 to receive and support a series of pans 10 for the calcium carbid. At the upper end of cylinder 9 is a diaphragm 11, which forms the bottom for the gas-holding chamber 13. A diaphragm 17 separates chamber 13 from the upper portion of the lamp-body forming a chamber 14. A tube 12 extends upward from the diaphragm 11 through the chambers 13 and 14 and is provided at its upper end with burner 15, controlled by cock 18. Near the upper end of chamber 13 the tube 12 is provided with an opening 16. The portion of the tube 12 within the chamber 13 is preferably of larger diameter than the portion immediately below the burner. From the chamber 14 a tube 19, open at both ends, leads downward nearly to the bottom of chamber 13, thus connecting the two chambers. A cock 20 serves to draw off water from the chamber 13. A tube 21 serves to admit air to the chamber 14, the tube extending from the side of the chamber through the top and being bent downward so as to form a trap to prevent the escape of water when the lamp is tipped, as hereinafter described. A tube 22 leads from the tube 6 of the reservoir upward through the side of the chamber 14, through its top, and is then bent downward, terminating within the chamber a short distance above the diaphragm 17. A coupling 24 serves to detachably connect the outer end of the tube 22 with the upper end of tube 6. The chamber 14 should be of such capacity relative to the chamber 13 as to be capable of containing as much water as will fill the chamber 13 up to the level of the cock 20. The lamp-body is provided with an annular shoulder 25, which rests on a flange 25' on the reservoir 3, supporting the lamp-body in such position that the lower edge of the cylinder 9 is slightly above the bottom of the chamber 1.

The vessel 26, which is received within the cylinder 9, comprises a cylinder adapted to fit within the cylinder 9 and a diaphragm 28 near its lower end by which the vessel is separated into two chambers. Within the lower chamber 28, against the lower side of the diaphragm 27, is formed a chamber 29, from the bottom of which a tube 30 open at its ends extends downward. Openings 31 and 32 formed in the diaphragm 27 and in the cylinder 26, respectively, communicate with the chamber 29. The pans 10 are arranged one above another in the upper chamber of the vessel 26 and are preferably carried by a holder 33, having an upwardly-extending rod 34, by which the pans may all be lifted together. At its lower edge the cylinder 26 is provided with openings 26' to permit water to pass freely into the chamber 28.

In preparing the lamp for use the lamp-body is lifted out of the chamber 1, the tube 22 being detached from tube 6. The lamp-body is then inverted, the cock 18 being closed, and water is poured into the chamber 9. The water flows through the opening 16 of the tube 12 into chamber 13, the air from the chamber escaping through tube 19 into chamber 14 and thence out through tube 21. As soon as the chamber 13 is nearly filled the lamp-body is restored to upright position and the cock 20 is opened, permitting any excess of water to escape, the cock being closed as soon as water ceases to flow from it. A quantity of water sufficient to fill the chamber 1 up to the diaphragm 27 is then placed in the chamber 1, the chamber 28 of the cylinder 26 forming a convenient measure of the quantity of water required. The pans 10 having been previously supplied with carbid and arranged upon the holder 33, the holder, with the pans, is placed in the cylinder 26, above the diaphragm 27, and the cylinder, with its contents, is introduced from below into the chamber 9 and held in position by any convenient means, such as a bayonet-joint. The lamp-body is then placed in position, with the cylinder 9 within the chamber 1 and the tube 22 connected with tube 6. The reservoir 3 having been filled with water through the filling-opening 4 and the opening closed by the plug 5, the cock 8 is opened, permitting water to flow to the chamber 1 and into the lower end of the cylinder 9, from which it flows into the chamber 28 and through openings 30 and 31 into the chamber 29 and finally through the opening 31 in diaphragm 27 into the upper portion of the cylinder 26 into contact with the carbid in the lowest carbid-pan 10. The gas generated by the action of the water on the carbid rises through the tube 12 and passes through the opening 16 into the chamber 13, the cock 20 being opened to permit the air in chamber 13 to escape. The air having escaped, the cock is closed and the gas accumulating in the chamber 13 forces the water contained therein up through the tube 19 into chamber 14, the air escaping from the chamber through tubes 21. As soon as the water in chamber 14 rises above the end of tube 22 it shuts off the supply of air from the reservoir, and thus stops the flow of water through the tube 7, as the pressure of the gas in the chamber 13 creates a back pressure in the cylinder 9, tending to force the water in the upper part of the cylinder 26 through the opening 31 and out into the space between the cylinder 9 and the cylinder 1, thus checking the generation of gas. In case the accumulation of gas in the chamber 13 is sufficient to force all of the water up the tube 19 any further accumulation of gas will escape through the tube 19 and through the water in the chamber 14 out through the tube 21.

It will be clear from this description that it is not necessary to construct the lamp to withstand excessive pressures, as the gas is permitted to escape before any excessive pressure is reached.

When the lamp is to be used, the cock 18 is opened and the gas ignited at the burner to which it is supplied by the tube 12. As the gas flows from the chamber 13 to the burner, relieving the pressure, the water will return to the chamber 13 from chamber 14. As soon as the level of the water in the chamber 14 is below the end of tube 22, air may flow through the tube to the reservoir 3, permitting further flow of water to the chamber 1 and causing fresh gas to be generated. Any impurities which may be present in the water in the reservoir 3 will be deposited in the chamber 28 and will not pass into the upper part of the cylinder 26.

Having thus described my invention, what I claim as new, and desire to secure by Letters Patent, is—

1. In an acetylene lamp, the combination of a lamp-body, a diaphragm dividing the lamp-body into an upper and lower chamber, a tube open at its ends leading from the upper chamber to a point near the bottom of the lower chamber, a carbid-chamber below the lower chamber, a water-reservoir above the level of the top of the carbid-chamber and in communication therewith, an air-inlet leading to the upper chamber of the lamp-body, an air-tube leading from the upper chamber of the lamp-body to the water-reservoir, a burner and a tube leading from the carbid-chamber to the burner communicating with the lower chamber of the lamp-body.

2. In an acetylene lamp, the combination of a lamp-body, a diaphragm dividing the lamp-body into an upper and lower chamber, a tube open at its ends leading from the upper chamber to a point near the bottom of the lower chamber, a carbid-chamber below the lower chamber, a burner, a tube leading from the carbid-chamber to the burner, and communicating with the lower chamber of the lamp-body, a water-reservoir above the level of the top of the carbid-chamber and communicating therewith, an air-inlet leading to the upper chamber of the lamp-body, and an air-tube having one end arranged within the upper chamber at a point near the bottom thereof and leading to the water-reservoir.

In testimony whereof I have signed this specification in the presence of two subscribing witnesses.

GIUSEPPE MASSINI.

Witnesses:
IDEL SECEEDITTI,
NERI GIOVANNI.